(12) United States Patent
Beuting et al.

(10) Patent No.: US 12,037,068 B2
(45) Date of Patent: Jul. 16, 2024

(54) ADJUSTABLE SEAT ASSEMBLY FOR A MOTORCYCLE, AND MOTORCYCLE

(71) Applicant: Bayerische Motoren Werke Aktiengesellschaft, Munich (DE)

(72) Inventors: Guido Beuting, Munich (DE); Helmut Diehl, Kochel (DE); Miroslav Nikolic, Munich (DE); Mathias Roesner, Munich (DE); Raimund Schell, Oberschleissheim (DE); Joerg Seiler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 584 days.

(21) Appl. No.: 17/292,778

(22) PCT Filed: Nov. 4, 2019

(86) PCT No.: PCT/EP2019/080016
§ 371 (c)(1),
(2) Date: May 11, 2021

(87) PCT Pub. No.: WO2020/120022
PCT Pub. Date: Jun. 18, 2020

(65) Prior Publication Data
US 2021/0394852 A1     Dec. 23, 2021

(30) Foreign Application Priority Data
Dec. 10, 2018 (DE) .................. 10 2018 131 582.1

(51) Int. Cl.
*B62J 1/10* (2006.01)
*B62J 1/06* (2006.01)

(52) U.S. Cl.
CPC .. *B62J 1/10* (2013.01); *B62J 1/06* (2013.01)

(58) Field of Classification Search
CPC ...................................... B62J 1/06; B62J 1/10
(Continued)

(56) References Cited

U.S. PATENT DOCUMENTS

| 4,462,634 A | 7/1984 | Hanagan |
| 4,787,594 A | 11/1988 | Ikegaya et al. |

(Continued)

FOREIGN PATENT DOCUMENTS

| CN | 1323267 A | 11/2001 |
| CN | 1517262 A | 8/2004 |

(Continued)

OTHER PUBLICATIONS

International Search Report (PCT/ISA/210) issued in PCT Application No. PCT/EP2019/080016 dated Jan. 30, 2020 with English translation (five (5) pages).

(Continued)

*Primary Examiner* — Minnah L Seoh
*Assistant Examiner* — Christopher B Wehrly
(74) *Attorney, Agent, or Firm* — Crowell & Moring LLP

(57) ABSTRACT

An adjustable seat assembly for a motorcycle includes a seat pan having a base shell, an adjustable shell, and an adjustment mechanism between the base shell and the adjustable shell. The base shell has a fastening portion for non-adjustable fastening of the base shell on the motorcycle. The adjustable shell is placed on the base shell and are connected via the adjustment mechanism. The adjustment mechanism is configured to adjust the height and/or inclination of the adjustable shell in relation to the base shell. A motorcycle having the adjustable seat assembly is also provided.

12 Claims, 6 Drawing Sheets

(58) Field of Classification Search
USPC .................................. 280/288.4; 297/215.15
See application file for complete search history.

(56) References Cited

U.S. PATENT DOCUMENTS

| | | | |
|---|---|---|---|
| 6,073,951 | A | 6/2000 | Jindra et al. |
| 6,488,337 | B1 | 12/2002 | De Voss et al. |
| 2007/0176403 | A1* | 8/2007 | Calderone .................. B62J 1/26 280/735 |
| 2009/0039690 | A1 | 2/2009 | Simon et al. |
| 2016/0090137 | A1* | 3/2016 | Mori ........................ B60N 2/40 701/49 |
| 2016/0325799 | A1* | 11/2016 | Ogawa ..................... B62J 1/005 |
| 2018/0141604 | A1* | 5/2018 | Uchiumi .................. B62J 1/065 |
| 2019/0093396 | A1 | 3/2019 | Sievers-Paulsen et al. |

FOREIGN PATENT DOCUMENTS

| | | |
|---|---|---|
| CN | 1970375 A | 5/2007 |
| CN | 101362445 A | 2/2009 |
| CN | 103189231 A | 7/2013 |
| CN | 203543722 U | 4/2014 |
| CN | 107010141 A | 8/2017 |
| CN | 107380306 A | 11/2017 |
| CN | 207902628 U | 9/2018 |
| CN | 108698654 A | 10/2018 |
| DE | 197 19 965 A1 | 11/1997 |
| DE | 197 19 965 C2 | 3/1999 |
| DE | 298 20 888 U1 | 4/2000 |
| DE | 100 30 590 A1 | 1/2002 |
| DE | 101 20 849 A1 | 10/2002 |
| DE | 603 02 757 T2 | 6/2006 |
| EP | 1 437 293 A2 | 7/2004 |
| JP | 10-291486 A | 11/1998 |
| WO | WO 2013/150574 A1 | 10/2013 |

OTHER PUBLICATIONS

German-language Written Opinion (PCT/ISA/237) issued in PCT Application No. PCT/EP2019/080016 dated Jan. 30, 2020 (five (5) pages).

German-language Search Report issued in German Application No. 10 2018 131 582.1 dated Aug. 6, 2019 with partial English translation (12 pages).

Chinese-language Office Action issued in Chinese Application No. 201980073894.8 dated Feb. 4, 2023 with English translation (12 pages).

English translation of Chinese-language Office Action issued in Chinese Application No. 201980073894.8 dated Sep. 23, 2022 (10 pages).

English translation of Chinese-language Office Action issued in Chinese Application No. 201980073894.8 dated Jul. 7, 2022 (eight (8) pages).

Chinese-language Office Action issued in Chinese Application No. 201980073894.8 dated Jan. 13, 2022 with English translation (19 pages).

* cited by examiner (a)

(b)

(a)

(b)

(a)

(b)

ADJUSTABLE SEAT ASSEMBLY FOR A MOTORCYCLE, AND MOTORCYCLE

BACKGROUND AND SUMMARY OF THE INVENTION

The invention relates to an adjustable seat assembly for a motorcycle, and to a motorcycle.

Motorcycles with a height-adjustable seat bench are known in different variants. In order to adjust the height of the seat bench, an adjusting apparatus is typically provided below the seat bench, which adjusting apparatus is actuated mechanically or electrically and is configured to adjust the height of the seat bench.

In the case of motorcycles, the seat bench usually adjoins the tank of the motorcycle. Therefore, in the case of an adjustment of the height of the seat bench, a gap which is situated between the tank and the seat bench changes. In addition, in the case of the adjustment of the height, a gap also changes between the seat bench and the body of the motorcycle, for example between the seat bench and a side trim panel. If said gaps become too large, rainwater can penetrate into one of the gaps and can pass to components of the motorcycle which are situated below the seat bench. Moreover, excessively large gaps can give the customer the impression of low value.

Therefore, it is an object of the invention to provide a motorcycle with an adjustable seat assembly, in the case of which motorcycle the disadvantages from the prior art are eliminated.

According to the invention, the object is achieved by way of an adjustable seat assembly for a motorcycle, with a seat pan which has a base shell and an adjusting shell, and with an adjusting device, the base shell having a fastening section for the fixed and non-adjustable fastening of the base shell to the motorcycle. The adjusting shell is placed onto the base shell, and the base shell and the adjusting shell are connected to one another via the adjusting device. The adjusting device is configured to adjust a height and/or an inclination of the adjusting shell with respect to the base shell.

A seat face for a rider and possibly for a pillion passenger is provided here on a seat cushion which is attached to the adjusting shell of the seat pan. Therefore, that part of the seat pan which is assigned to the actual seat face can thus be adjusted by means of the adjusting device.

In contrast, the base section of the seat pan which is accordingly not assigned any seat face is connected fixedly and non-adjustably to a component of the motorcycle, in particular to a frame part of the motorcycle.

The seat pan is to be understood to mean all the frame parts of the seat assembly, that is to say not, for example, seat cushions of the seat assembly which are attached to the seat pan.

It is a core concept of the invention for, in addition to the base shell of the seat pan, a further shell, namely the adjusting shell to be provided. The base shell and the adjusting shell form together as it were a seat pan with a double bottom, the two shells fulfilling tasks which are different than one another. The base shell is connected fixedly and non-adjustably to the motorcycle, as a result of which a gap is ensured between the base shell and the motorcycle, which gap remains constant in the case of a height and/or inclination adjustment of the adjusting shell (and therefore in the case of an adjustment of the seat face). The result is therefore an unchanged gap pattern between the seat assembly and the body of the motorcycle even in the case of the height and/or inclination adjustment of the adjusting shell. Here, the size of the gap can be selected in such a way that the penetration of rainwater below the adjustable seat assembly is prevented. Therefore, reliable weather protection of components of the motorcycle which lie below the seat assembly with at the same time a height and/or inclination adjusting capability of the seat face is achieved by way of the seat assembly according to the invention.

One aspect of the invention provides that the adjusting device comprises at least one adjusting element which is arranged between the base shell and the adjusting shell and is configured to adjust the height and/or the inclination of the adjusting shell with respect to the base shell. The adjusting element defines a spacing between a contact point of the adjusting element with respect to the base shell and a contact point of the adjusting element with respect to the adjusting shell, as a result of which the height and/or the inclination of the adjusting shell with respect to the base shell are/is also defined.

The at least one adjusting element is preferably configured as a toggle lever, which is arranged between the base shell and the adjusting shell and is connected to them in a force-transmitting manner, or as a cam, the at least one adjusting element being arranged, in particular, on a shaft which is connected to the base shell. As described above in general for the adjusting element, the toggle lever or the cam has in each case at least one contact point with respect to the base shell and with respect to the adjusting shell, and defines a spacing between said two contact points, as a result of which the height and/or the inclination of the adjusting shell with respect to the base shell can also be defined.

The toggle lever or the cam is preferably arranged on the shaft which is connected rotatably to the base shell. By way of rotation of the shaft, the adjusting element is actuated, and the height and/or the inclination of the adjusting shell with respect to the base shell are/is changed accordingly.

For example, the adjusting device comprises a locking device which is configured to release and/or to lock the height and/or inclination adjustment of the adjusting shell. In particular, the shaft can be secured against rotation by means of the locking device. The locking device reliably prevents the height and/or the inclination of the adjusting shell with respect to the base shell being changed unintentionally.

As an alternative, the at least one adjusting element can be configured as a pneumatically and/or hydraulically actuable fluid cushion. The fluid cushion is preferably attached to the base shell, and has at least one contact point with respect to the adjusting shell. The fluid cushion extends, starting from the base shell, over a defined height, depending on how much air and/or liquid are/is situated in the fluid cushion. Accordingly, the height and/or the inclination of the adjusting shell with respect to the base shell can be adjusted by virtue of the fact that air and/or liquid are/is pumped into the fluid cushion or are/is discharged from the fluid cushion. Here, the height and/or the inclination of the adjusting shell with respect to the base shell are/is greater, the more air and/or liquid are/is situated in the fluid cushion. In this way, in particular, the height and/or the inclination of the adjusting shell can be adjusted in an infinitely variable manner.

In accordance with one refinement of the invention, the adjusting device comprises a pump which is connected in a fluid-conducting manner to the fluid cushion and is configured to pump a fluid into the fluid cushion and/or to pump the fluid out of the fluid cushion. Accordingly, in order to adjust the adjusting shell, the pump is actuated manually or automatically, for example by means of an electric motor. The fluid can be air or a liquid.

If the fluid is air, one-way operation of the pump is also conceivable, with the result that the pump is configured merely to pump air into the fluid cushion. In order to discharge the air again, a discharge valve can be provided on the fluid cushion.

A further aspect of the invention provides that at least one further adjusting element is provided which is arranged between the base shell and the adjusting shell and is configured to adjust the height and/or the inclination of the adjusting shell with respect to the base shell, the two adjusting elements being arranged offset with respect to one another in a longitudinal direction of the seat assembly. Here, the two adjusting elements have in each case at least one contact point with respect to the base shell and at least one contact point with respect to the adjusting shell and, as described above, define in each case a spacing between said two contact points. By virtue of the fact that the adjusting elements are offset with respect to one another in the longitudinal direction of the seat assembly, both the height and the inclination of the adjusting shell with respect to the base shell can be changed in a simple way by way of actuation of the two adjusting elements.

Here, the longitudinal direction of the seat assembly is to be understood to mean that direction which corresponds to the longitudinal direction of the motorcycle after the assembly of the seat assembly on the motorcycle.

In particular, the two adjusting elements are in each case a toggle lever, a cam or a fluid cushion, as described above.

The two adjusting elements can preferably be actuated independently of one another. Accordingly, both the height and the inclination of the adjusting shell with respect to the base shell can be set individually. In particular, merely the height of the adjusting shell is changed if the two adjusting elements are actuated at the same time in the same direction. If, in contrast, merely one of the two adjusting elements is actuated or if the two adjusting elements are actuated at the same time in different directions, the inclination of the adjusting shell is changed.

In particular, the adjusting device can be actuated mechanically and/or electrically. Accordingly, the adjusting device comprises an electric motor and/or a mechanical mechanism, by means of which the at least one adjusting element can be actuated. The actuation of the at least one adjusting element can take place at least partially automatically and/or manually.

The at least one adjusting element can preferably be actuated here, without it being necessary for parts such as, for example, seat cushions to be removed from the seat assembly. For this purpose, the adjusting device can have an actuating element which is accessible from outside the motorcycle, such as, for example, an adjusting wheel for actuating the mechanical mechanism and/or an actuating switch for the electric motor.

According to a further refinement of the invention, the base shell has at least one guide element, onto which the adjusting shell is placed, the guide element engaging, in particular, into an opening in the adjusting shell. In particular, the opening in the adjusting shell is configured as a through opening, the guide element penetrating through the through opening. Here, the guide element preferably bears on its lateral sections (as viewed in the longitudinal direction of the seat assembly) against an inner wall of the through opening. The at least one guide element therefore prevents the adjusting shell moving, as viewed in the longitudinal direction of the seat assembly, laterally with respect to the base shell, the height and/or inclination adjusting capability being maintained at the same time.

The guide element preferably runs predominantly vertically, the guide element being inclined, in particular, in the longitudinal direction of the seat assembly and enclosing an angle with the vertical of at most 45°, preferably at most 30°, further preferably at most 20°.

Furthermore, according to the invention, the object is achieved by way of a motorcycle with a seat assembly according to one of the preceding claims, the base shell being attached fixedly and non-adjustably to the motorcycle. With regard to the advantages, reference is made to the above comments.

The motorcycle can comprise a control unit which is configured to actuate the adjusting device automatically in a manner which is based on operating parameters of the motorcycle, in particular in a manner which is based on a speed of the motorcycle. For example, the control unit actuates the adjusting device in such a way that the adjusting shell has a smaller inclination and/or a smaller height at low speeds, in particular when starting, than at higher speeds.

The height of the seat face is preferably reduced at low speeds, in particular when the motorcycle is stopping, with the result that the rider can reach the ground with his/her legs more easily.

Further preferably, the inclination of the seat face is increased as the speed increases and/or in the case of pronounced acceleration, that is to say if the acceleration exceeds a predefined limit value, with the result that the rider requires less force, in order to hold onto the motorcycle firmly counter to the increasing wind resistance.

Further advantages and properties of the invention result from the following description and the appended drawings.

DETAILED DESCRIPTION OF THE DRAWINGS

Figure 1:
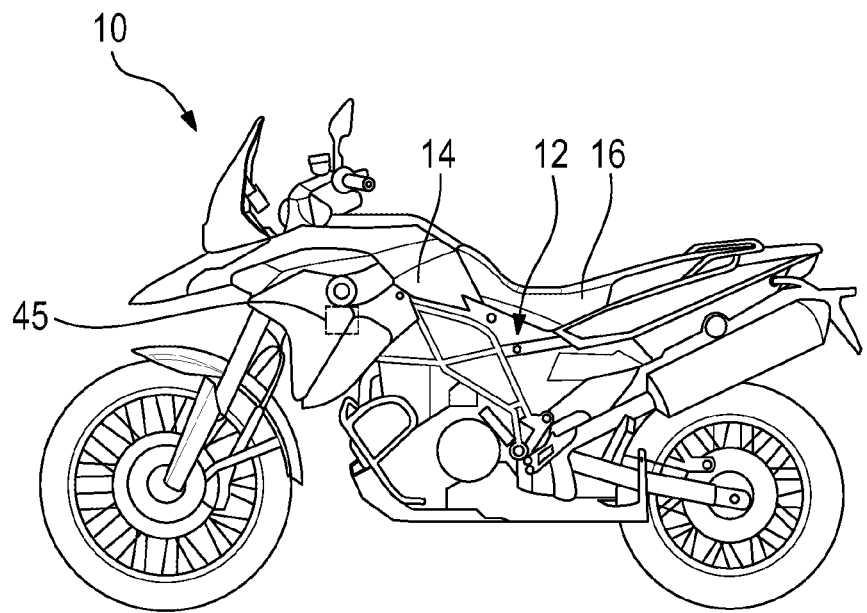
FIG. 1 shows a side view of a motorcycle according to the invention with a seat assembly according to an embodiment of the present invention.

FIG. 1 shows a motorcycle 10 which is configured as a motorbike. The motorcycle has a body 12, a tank 14 and an adjustable seat assembly 16 which is attached to the motorcycle 10 behind the tank 14 in relation to a longitudinal direction of the motorcycle 10.

As an alternative to this, however, the tank 14 can also be provided at another location of the motorcycle 10, for example in the region of the rear of the motorcycle 10 or below the seat assembly 16.

Figure 2:
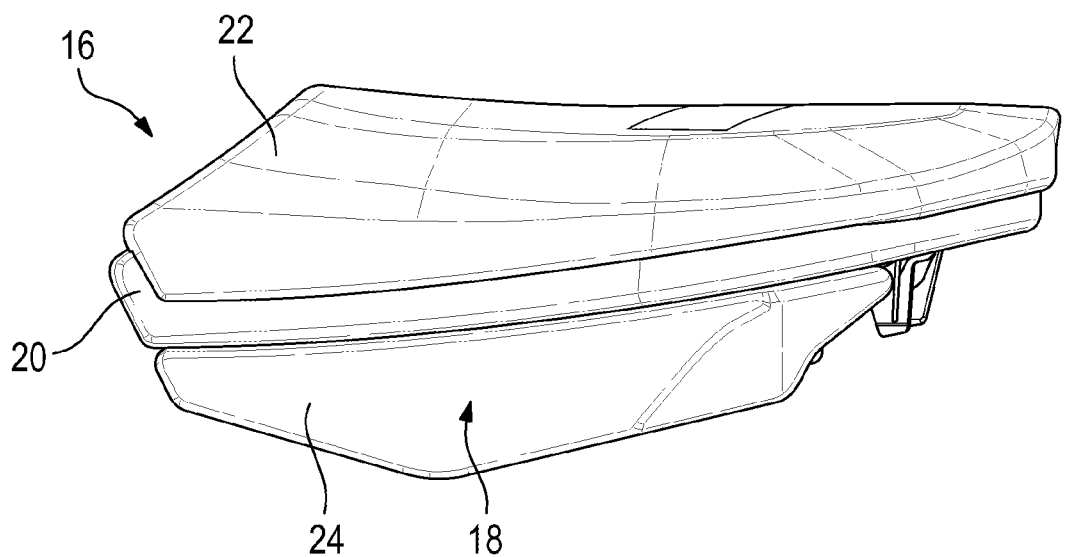
FIG. 2 shows a diagrammatic side view of the seat assembly according to FIG. 1.

FIG. 2 shows a seat assembly 16 in a side view. The seat assembly 16 has a seat pan 18, to which a seat cushion 20 is attached which is covered with a seat cushion cover 22. Here, the seat cushion 20 forms a seat face for a rider of the motorcycle 10 and possibly for a pillion passenger.

Figure 3:
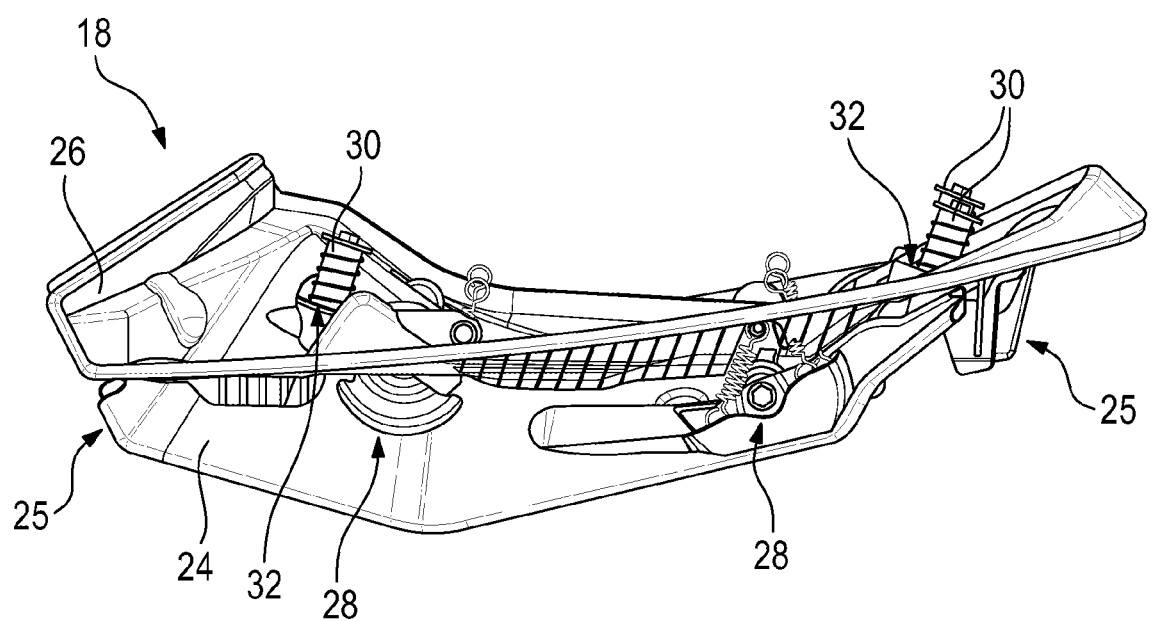
FIG. 3 shows a side view of the seat assembly according to the invention from FIG. 2 with a removed seat cushion.

FIG. 3 shows the seat assembly 16 in a side view with a removed seat cushion 20. The seat pan 18 has a base shell 24 which is attached via a fastening section 25 fixedly and non-displaceably to the body 12 and/or to a frame part of the motorcycle 10. Furthermore, the seat pan 18 has an adjusting shell 26 which is placed onto the base shell 24.

The seat assembly 16 has an adjusting device 28 which connects the base shell 24 and the adjusting shell 26 and is configured to adjust a height and/or an inclination of the adjusting shell 26 with respect to the base shell 24.

The base shell 24 has three guide elements 30 which extend in each case through one of two through openings 32 which are provided in the adjusting shell 26. Any desired other number of guide elements 30 can also be provided, however. Here, the guide elements 30 bear on their lateral sections (as viewed in the longitudinal direction of the seat assembly 16) in each case against an inner wall of the corresponding through opening 32. Here, the two guide elements 30 prevent a lateral movement (as viewed in the longitudinal direction of the motorcycle 10) of the adjusting shell 26 with respect to the base shell 24.

The guide elements 30 further preferably run, starting from the base shell 24, in each case predominantly vertically, the guide elements 30 being inclined, in particular, toward the rear in each case in the longitudinal direction of the seat assembly 16 and enclosing an angle with the vertical of at most 45°, preferably at most 30°, further preferably at most 20°.

As an alternative, the guide elements 30 can also be configured as hinges and/or as pivot pins which are attached in each case to the base shell 24 and the adjusting shell 26, with the result that the base shell 24 and the adjusting shell 26 are connected to one another such that they can be moved relative to one another.

Figure 4:
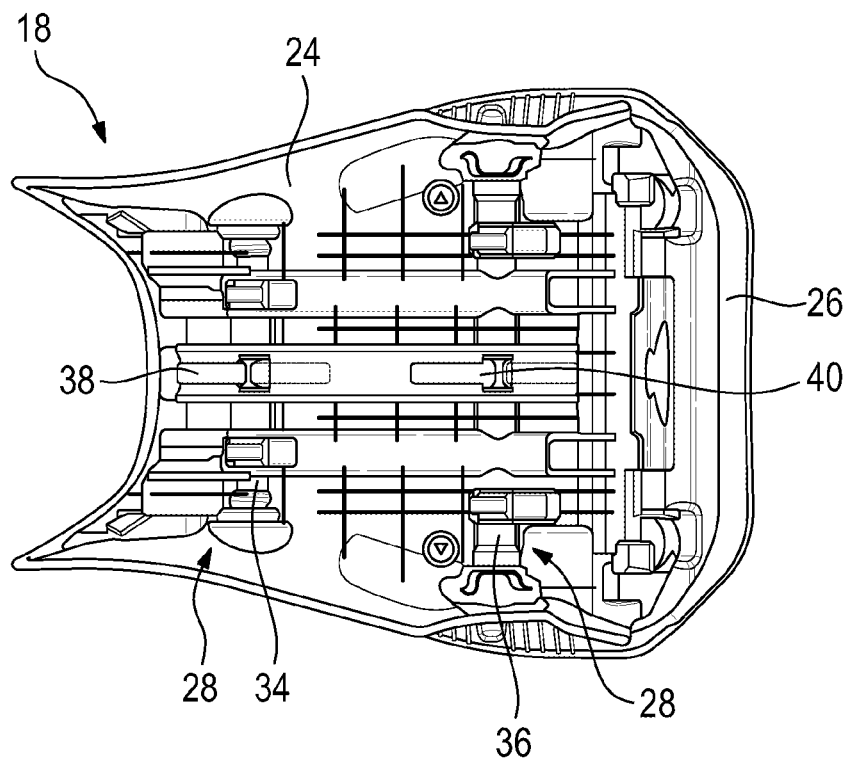
FIGS. 4a and 4b show a plan view and a view from below, respectively, of the seat assembly according to the invention from FIG. 2 in accordance with a first embodiment.
Figure 4:
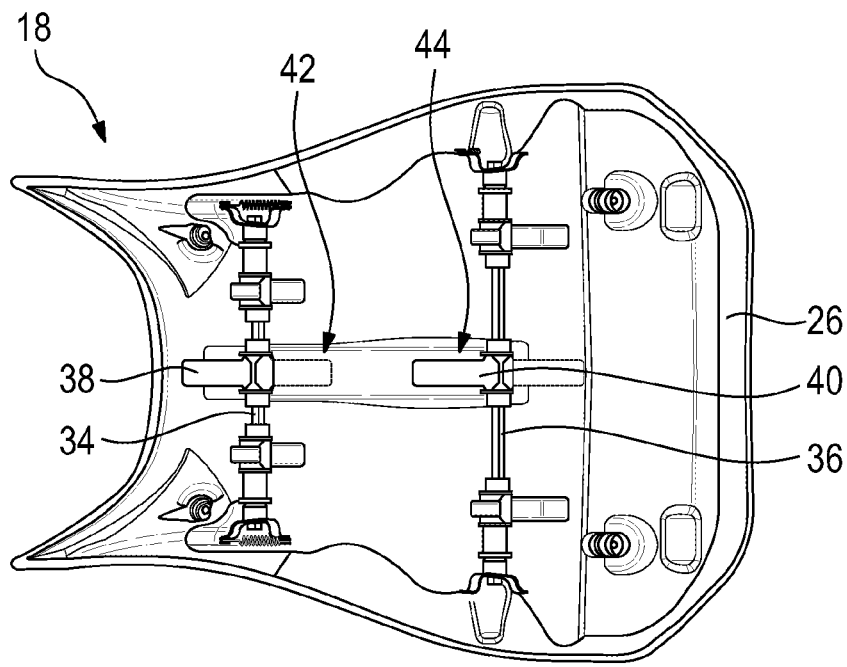

FIG. 4a shows the base shell 24 with an adjusting device 28 in accordance with a first embodiment in a plan view, the adjusting shell 26 being shown merely in part for illustration reasons. The adjusting shell 26 extends, however, substantially over the entire base shell 24.

The adjusting device 28 has a first shaft 34 and a second shaft 36 which are attached to the base shell 24 such that they are offset with respect to one another in the longitudinal direction of the seat assembly 16 and cannot be displaced in each case with respect to the base shell 24, but can be rotated with respect to the base shell 24.

A first adjusting element 38 is attached fixedly to the first shaft 34 so as to rotate with it. In an analogous manner with respect to this, a second adjusting element 40 is attached fixedly to the second shaft 36 so as to rotate with it. In the embodiment which is shown, the two adjusting elements 38, 40 are configured in each case as toggle levers.

FIG. 4b shows the adjusting shell 26 in a view from below, the base shell 24 not being shown for illustration reasons, but the two shafts 34, 36 with the two adjusting elements 38, 40 being shown.

The first adjusting element 38 has a first contact point 42 with respect to the adjusting shell 26, whereas the second adjusting element 40 has a second contact point 44 with respect to the adjusting shell 26.

Figure 5:
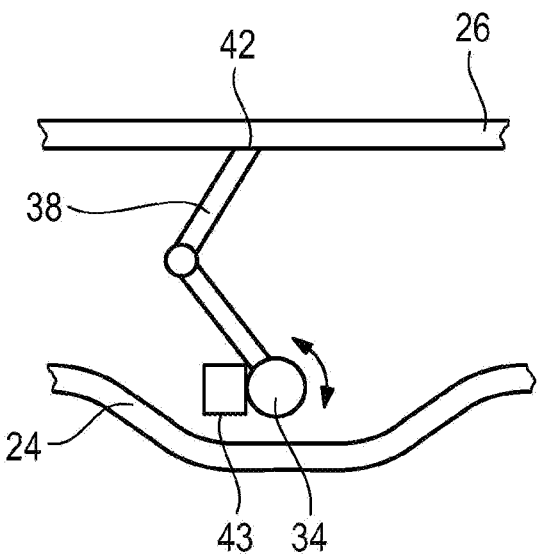
FIGS. 5a and 5b diagrammatically show a cross section of the seat assembly according to the invention from FIG. 2 in accordance with the first embodiment and in accordance with a second embodiment, respectively.
Figure 5:
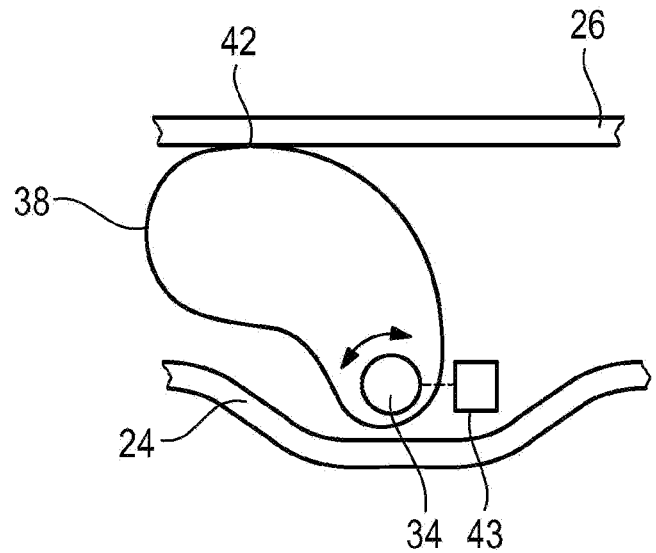

As illustrated diagrammatically in FIG. 5a, the first adjusting element 38 defines a spacing between the first shaft 34 and the first contact point 42 here, and therefore defines a local spacing between the base shell 24 and the adjusting shell 26. If the first shaft 34 is rotated, said spacing changes.

In an analogous manner with respect to this, the second adjusting element 40 defines a spacing between the second shaft 36 and the second contact point 44, and therefore defines a local spacing between the base shell 24 and the adjusting shell 26. If the second shaft 36 is rotated, said spacing changes.

Since the two shafts 34, 36 are offset with respect to one another in the longitudinal direction of the seat assembly 16, the height and/or the inclination of the adjusting shell 26 with respect to the base shell 24 can be set by way of rotation of the two shafts 34, 36.

The two shafts 34, 36 can preferably be rotated independently of one another, with the result that both the height and the inclination of the adjusting shell 26 with respect to the base shell 24 can be set individually.

In particular, merely the height of the adjusting shell 26 is changed if the two adjusting elements 38, 40 are actuated at the same time in the same direction. If, in contrast, merely one of the two adjusting elements 38, 40 is actuated or if the two adjusting elements 38, 40 are actuated at the same time in different directions, the inclination of the adjusting shell 26 is changed.

In particular, the adjusting device 28 can be actuated mechanically and/or electrically. Accordingly, the adjusting device 28 comprises at least one electric motor 43 and/or a mechanical mechanism, by means of which at least one shaft, preferably the two shafts 34, 36, can be rotated.

The adjusting device preferably comprises two electric motors 43 which are connected in each case in a torque-transmitting manner to one of the shafts 34, 36 and are configured to rotate the respective associated shaft 34, 36.

Here, the electric motors 43 can be actuated, without it being necessary for parts such as, for example, the seat cushion 20 to be removed from the seat assembly 16. For this purpose, the adjusting device 28 can have an actuating element which is accessible from outside the motorcycle 10, such as, for example, an actuating switch for the electric motors 43, which actuating switch can be arranged on a dashboard and/or on handlebars of the motorcycle 10.

The adjusting device 28 can comprise a locking device which is configured to release and/or to lock the height and/or inclination adjustment of the adjusting shell 26. In the above-described embodiment, the locking device can be formed, for example, by way of the electric motors 43 themselves which can be operated in a locking mode, in which they prevent the rotation of the two shafts 34, 36.

The motorcycle 10 can optionally have a control unit 45 (FIG. 1) which is configured to actuate the adjusting device 28 automatically in a manner which is based on operating parameters of the motorcycle 10, in particular in a manner which is based on a speed of the motorcycle 10.

For example, the control unit actuates the adjusting device 28 in such a way that the adjusting shell 26 has a lower inclination and/or a lower height at low speeds, in particular when starting, than at higher speeds.

The height of the seat face is preferably reduced at low speeds, in particular when the motorcycle 10 is stopping, with the result that the rider can reach the ground with his/her legs more easily.

Further preferably, the inclination of the seat face is increased as the speed increases and/or in the case of pronounced acceleration, that is to say if the acceleration exceeds a predefined limit value, with the result that the rider requires less force, in order to hold onto the motorcycle 10 firmly counter to the increasing wind resistance.

In the following text, further embodiments of the seat assembly 16 will be described, largely functionally identical components bearing the same designations. Here, merely the differences with respect to the above-described embodiment will be described in the following text.

FIG. 5b diagrammatically shows a second embodiment of the adjusting device 28, in the case of which the first adjusting element 38 is configured as a cam.

The fundamental method of operation is the same as described above, however. The first adjusting element 38 defines a spacing of the first shaft 34 with respect to the first contact point 42, said spacing changing in the case of a rotation of the first shaft 34 on account of the non-round contour of the cam. In an analogous manner with respect to this, the second adjusting element 40 can also be configured as a cam.

Figure 6:
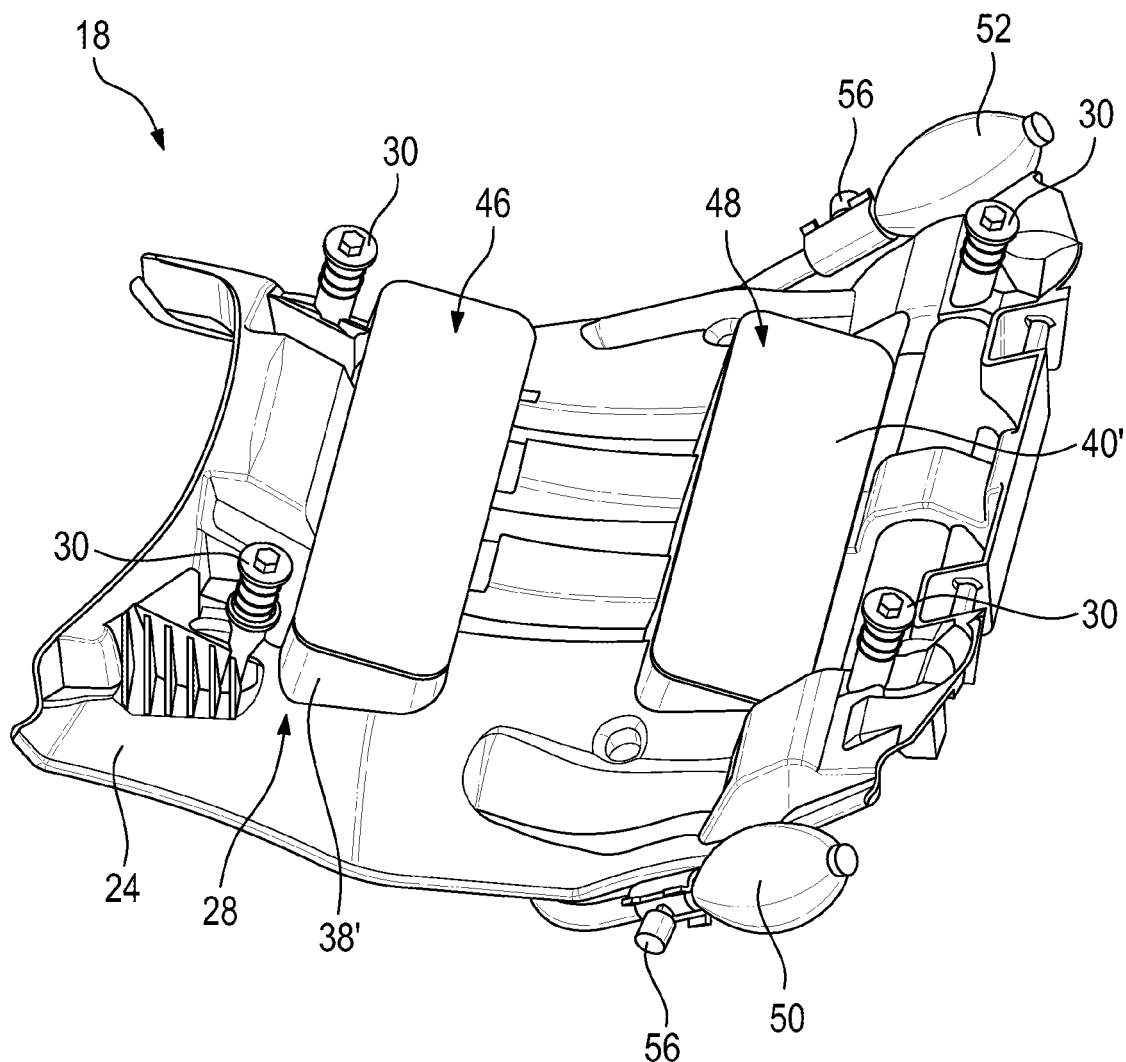
FIG. 6 shows an oblique view of the seat assembly according to the invention from FIG. 2 in accordance with a third embodiment.
Figure 7:
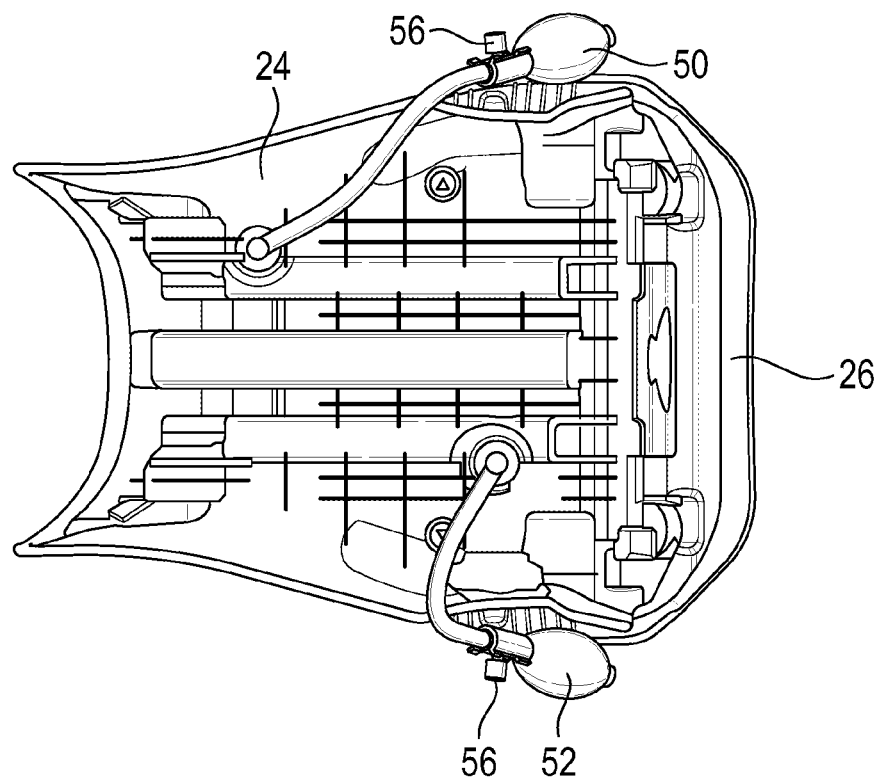
FIGS. 7a and 7b in each case show a view from below of the seat assembly according to the invention from FIG. 6.
Figure 7:
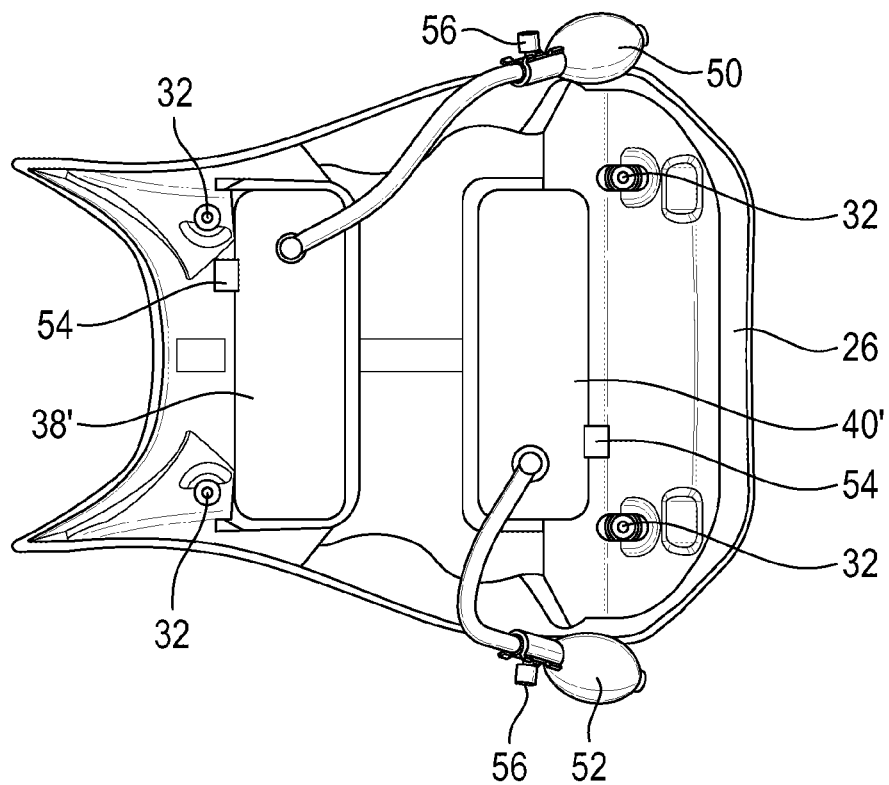

FIGS. 6 and 7 show a third embodiment of the seat assembly 16 in an oblique view, in the case of which the two shafts 34, 36 and the two adjusting elements 38, 40 in accordance with the above-described embodiments are replaced by a first adjusting element 38' and a second adjusting element 40', the two adjusting elements 38', 40' being configured in each case as a pneumatically and/or hydraulically actuable fluid cushion.

The two adjusting elements 38', 40' are attached fixedly and non-displaceably to the base shell 24 in a manner which is offset with respect to one another in the longitudinal direction of the seat assembly 16.

Here, the two adjusting elements 38', 40' are of substantially rectangular configuration and extend in each case transversely with respect to the longitudinal direction of the seat assembly 16.

On their upper side, the first adjusting element 38' and the second adjusting element 40' have a first contact face 46 and a second contact face 48, respectively, with respect to the adjusting shell 26.

In addition, the adjusting device 28 comprises a first pump 50 and a second pump 52 which are connected in a fluid-conducting manner to the first adjusting element 38' and the second adjusting element 40', respectively. The two pumps 50, 52 are configured to pump a fluid into the respective adjusting element 38' and 40', respectively, and/or to pump the fluid out of the respective adjusting element 38' and 40', respectively.

The adjusting elements 38', 40' extend, starting from the base shell 24, in each case over a defined height, depending on how much air and/or liquid are/is situated in the fluid cushions. Accordingly, the height and/or the inclination of the adjusting shell 26 with respect to the base shell 24 can be adjusted by the fact that air and/or liquid are/is pumped into the adjusting elements 38', 40' or are/is discharged from the adjusting elements 38', 40'. Here, the height and/or the inclination of the adjusting shell 26 with respect to the base shell 24 is greater, the more air and/or liquid are/is situated in the fluid cushions.

If the fluid is air, one-way operation of the pumps 50, 52 is also conceivable, with the result that the pumps 50, 52 are configured merely to pump air into the fluid cushions. In order to discharge the air again, a discharge valve 54 can be provided in each case on the adjusting elements 38', 40'.

For example, the adjusting device 28 comprises two electric motors which are assigned in each case to one of the pumps 50, 52 and are configured to actuate the respective associated pump 50, 52.

The adjusting device 28 comprises a locking device which is configured to release and/or to lock the height and/or inclination adjustment of the adjusting shell 26. For example, the locking device is formed by way of control valves 56, the first pump 50 and the second pump 52 being assigned in each case one control valve 56. The control valves 56 are configured to release and/or to lock a fluid flow into the two adjusting elements 38', 40' and/or out of the two adjusting elements 38', 40'.

In all above-described embodiments, only one of the two adjusting elements 38, 40 or 38', 40' can of course also be provided. Depending on the arrangement of said one adjusting element, the height and/or the inclination of the adjusting shell 26 with respect to the base shell 24 can then be adjusted.

What is claimed is:

1. An adjustable seat assembly for a motorcycle, comprising:
   a seat pan having a base shell and an adjusting shell; and
   an adjusting device,
   wherein
   the base shell is fastened to the motorcycle such that it is fixed and non-adjustable,
   the adjusting shell is located on the base shell,
   the base shell and the adjusting shell are connected to one another via the adjusting device,
   the adjusting device is configured to adjust at least one of a height and an inclination of the adjusting shell with respect to the base shell,
   the base shell has at least one guide element extending predominantly vertically,
   the at least one guide element engaging into an opening in the adjusting shell and bears on its lateral sections, as viewed in the longitudinal direction of the seat assembly, against an inner wall of the opening in the adjusting shell.

2. The seat assembly according to claim 1, wherein
   the adjusting device includes at least one adjusting element arranged between the base shell and the adjusting shell, and
   the at least one adjusting element is configured to adjust at least one of the height and the inclination of the adjusting shell with respect to the base shell.

3. The seat assembly according to claim 2, wherein
   the at least one adjusting element is a toggle lever arranged between the base shell and the adjusting shell,
   the toggle lever is connected to the base shell and the adjusting shell in a force-transmitting manner, and
   the at least one adjusting element is arranged on a shaft connected to the base shell.

4. The seat assembly according to claim 2, wherein
   the at least one adjusting element is a cam arranged between the base shell and the adjusting shell,
   the cam is connected to one of the base shell and the adjusting shell and in contact with the other of the base shell and the adjusting shell in a force-transmitting manner, and
   the cam is arranged on a shaft connected to the base shell.

5. The seat assembly according to claim 2, wherein
   the at least one adjusting element is a fluid cushion configured to be actuated by at least one of pneumatically and hydraulically.

6. The seat assembly according to claim 5, wherein
   the adjusting device includes a pump connected in a fluid-conducting manner to the fluid cushion and configured to pump a fluid at least one of into the fluid cushion and out of the fluid cushion.

7. The seat assembly according to claim 2, wherein
at least one further adjusting element is arranged between the base shell and the adjusting shell,
the at least one further adjusting element is configured to adjust at least one of the height and the inclination of the adjusting shell with respect to the base shell, and
the at least one adjusting element and the at least one further adjusting element are arranged offset with respect to one another in a longitudinal direction of the seat assembly.

8. The seat assembly according to claim 7, wherein
the at least one adjusting element and the at least one further adjusting element are actuatable independently of one another.

9. The seat assembly according to claim 2, wherein the adjusting device is at least one of mechanically and electrically actuable.

10. A motorcycle with a seat assembly, comprising:
a seat pan having a base shell and an adjusting shell; and
an adjusting device,
wherein
the base shell is fastened to the motorcycle such that it is fixed and non-adjustable,
the adjusting shell is located on the base shell,
the base shell and the adjusting shell are connected to one another via the adjusting device,
the adjusting device is configured to adjust at least one of a height and an inclination of the adjusting shell with respect to the base shell,
the base shell is attached fixedly and non-adjustably to the motorcycle,
the base shell has at least one guide element extending predominantly vertically,
the at least one guide element engaging into an opening in the adjusting shell and bears on its lateral sections, as viewed in the longitudinal direction of the seat assembly, against an inner wall of the opening in the adjusting shell.

11. The motorcycle according to claim 10, wherein
the motorcycle comprises a controller configured to actuate the adjusting device automatically based on at least one operating parameter of the motorcycle.

12. The motorcycle according to claim 11, wherein
The at least one operating parameter includes a speed of the motorcycle.

\* \* \* \* \*